United States Patent
Clemen, Jr. et al.

(10) Patent No.: US 10,494,080 B2
(45) Date of Patent: *Dec. 3, 2019

(54) THERMAL INSULATION FOR AIRCRAFT COMPONENTS

(71) Applicant: The Boeing Company, Chicago, IL (US)

(72) Inventors: Mark Joseph Clemen, Jr., Port Orchard, WA (US); Jerry Lee Wert, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 366 days.

This patent is subject to a terminal disclaimer.

(21) Appl. No.: 15/590,693

(22) Filed: May 9, 2017

(65) Prior Publication Data
US 2017/0240266 A1    Aug. 24, 2017

Related U.S. Application Data

(63) Continuation-in-part of application No. 14/881,337, filed on Oct. 13, 2015, now Pat. No. 9,758,235.

(51) Int. Cl.
*B64C 1/40* (2006.01)
*B64C 30/00* (2006.01)
*B64C 1/38* (2006.01)
*H01F 7/02* (2006.01)

(52) U.S. Cl.
CPC ........... *B64C 1/40* (2013.01); *B64C 1/38* (2013.01); *B64C 30/00* (2013.01); *H01F 7/0236* (2013.01)

(58) Field of Classification Search
CPC .. B64C 1/40; B64C 1/38; B64C 30/00; H01F 7/0236
See application file for complete search history.

(56) References Cited

U.S. PATENT DOCUMENTS 6,220,346 B1 *   4/2001   Gissler .................. E21B 36/003
                                                            166/57
2009/0145912 A1   6/2009   Hyde et al.

FOREIGN PATENT DOCUMENTS

GB        1361426 A     7/1974
WO      0073624 A1    12/2000

* cited by examiner

*Primary Examiner* — Ramon M Barrera
(74) *Attorney, Agent, or Firm* — Duft & Bornsen, PC

(57) ABSTRACT

A thermal insulation system for an aircraft is provided. The thermal insulation system includes a carrier and a container. The carrier has an interior surface including a first plurality of magnets that generate a first magnetic field, and an exterior surface that is thermally coupled to at least one high temperature component. The container is surrounded by the interior surface of the carrier, has an exterior surface including a second plurality of magnets that generate a second magnetic field oriented opposite the first magnetic field, and has an interior surface that is thermally coupled to at least one temperature sensitive component. The first magnetic field and the second magnetic field generate a gap between the carrier and the container to reduce a heat transfer from the at least one high temperature component to the at least one temperature sensitive component during operation of the aircraft.

20 Claims, 12 Drawing Sheets

THERMAL INSULATION FOR AIRCRAFT COMPONENTS

RELATED APPLICATIONS

This non-provisional patent application is a continuation-in-part of U.S. patent application Ser. No. 14/881,337 filed on Oct. 13, 2015 entitled "THERMAL INSULATION SYSTEM, AIRCRAFT, AND VEHICLE HAVING SAME", which is incorporated by reference herein in its entirety.

FIELD

This disclosure relates to the field of aircraft, and in particular, to mitigating the thermal effects of flight on the electronics onboard an aircraft.

BACKGROUND

Hypersonic flight is often characterized as flight through the atmosphere at speeds above Mach 5. At these speeds, aerodynamic heating of the leading surfaces of the aircraft become problematic. Aerodynamic heating is the heating of a body produced by the flow of a fluid (e.g., air) over the body.

In hypersonic flight, the speed of the air molecules impinging on the aircraft rapidly falls to zero near the leading edges of the aircraft. Heating of the leading surfaces occurs as the kinetic energy of the air molecules is converted into thermal energy. The thermal energy heats the leading surfaces, which can transfer heat to other portions of the aircraft (e.g., electronics onboard the aircraft). At hypersonic speeds, the temperature of the leading surfaces can exceed 1000 degrees Celsius. Considerable effort has been made in the last few decades attempting to solve problems associated with aerodynamic heating of hypersonic vehicles.

SUMMARY

One aspect comprises a thermal insulation system for an aircraft that includes at least one high temperature component and at least one temperature sensitive component. The thermal insulation system comprises a carrier having an interior surface that includes a first plurality of magnets that generate a first magnetic field, and an exterior surface that is thermally coupled to the at least one high temperature component. The thermal insulation system further comprises a container surrounded by the interior surface of the carrier that has an exterior surface including a second plurality of magnets that generate a second magnetic field oriented opposite the first magnetic field, and an interior surface that is thermally coupled to the at least one temperature sensitive component. The first magnetic field and the second magnetic field generate a gap between the interior surface of the carrier and the exterior surface of the container to reduce a heat transfer from the at least one high temperature component to the at least one temperature sensitive component.

Another aspect comprises a method of thermally isolating a high temperature component of an aircraft from a temperature sensitive component of the aircraft during operation of the aircraft. The method comprises generating a first magnetic field utilizing a first plurality of magnets that are proximate to an interior surface of a carrier onboard the aircraft, where the carrier includes an external surface that is thermally coupled to the high temperature component. The method further comprises generating a second magnetic field oriented opposite the first magnetic field utilizing a second plurality of magnets that are proximate to an exterior surface of a container that is surrounded by the interior surface of the carrier, where the container has an interior surfaced that is thermally coupled to the temperature sensitive component. The method further comprises generating a gap between the interior surface of the carrier and the exterior surface of the container utilizing the first magnetic field and the second magnetic field to reduce a heat transfer from the high temperature component to the temperature sensitive component during the operation of the aircraft.

Another aspect comprises a method of assembly of a thermal insulation system for an aircraft that includes a high temperature component and a temperature sensitive component. The method comprises coupling a first plurality of magnets to an interior surface of a carrier, where the first plurality of magnets generates a first magnetic field. The method further comprises thermally coupling the high temperature component to an exterior surface of the carrier. The method further comprises coupling a second plurality of magnets to an exterior surface of a container, where the second plurality of magnets generates a second magnetic field oriented opposite the first magnetic field. The method further comprises thermally coupling the temperature sensitive component to an interior surface of the container. The method further comprises positioning the container within an interior space of the carrier, where the interior space is defined by the interior surface of the carrier.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some aspects are now described, by way of example only, and with reference to the accompanying drawings. The same reference number represents the same element or the same type of element on all drawings.

DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Embodiments described herein provide thermal insulation for aircraft components using magnetic fields to generate a gap between the high temperature components (e.g., the leading surfaces of the aircraft) and the temperature sensitive components (e.g., the electronics onboard the aircraft) during flight, such as during flight at hypersonic speeds. The gap can reduce a heat transfer from the high temperature components to the temperature sensitive components.

Figure 1:
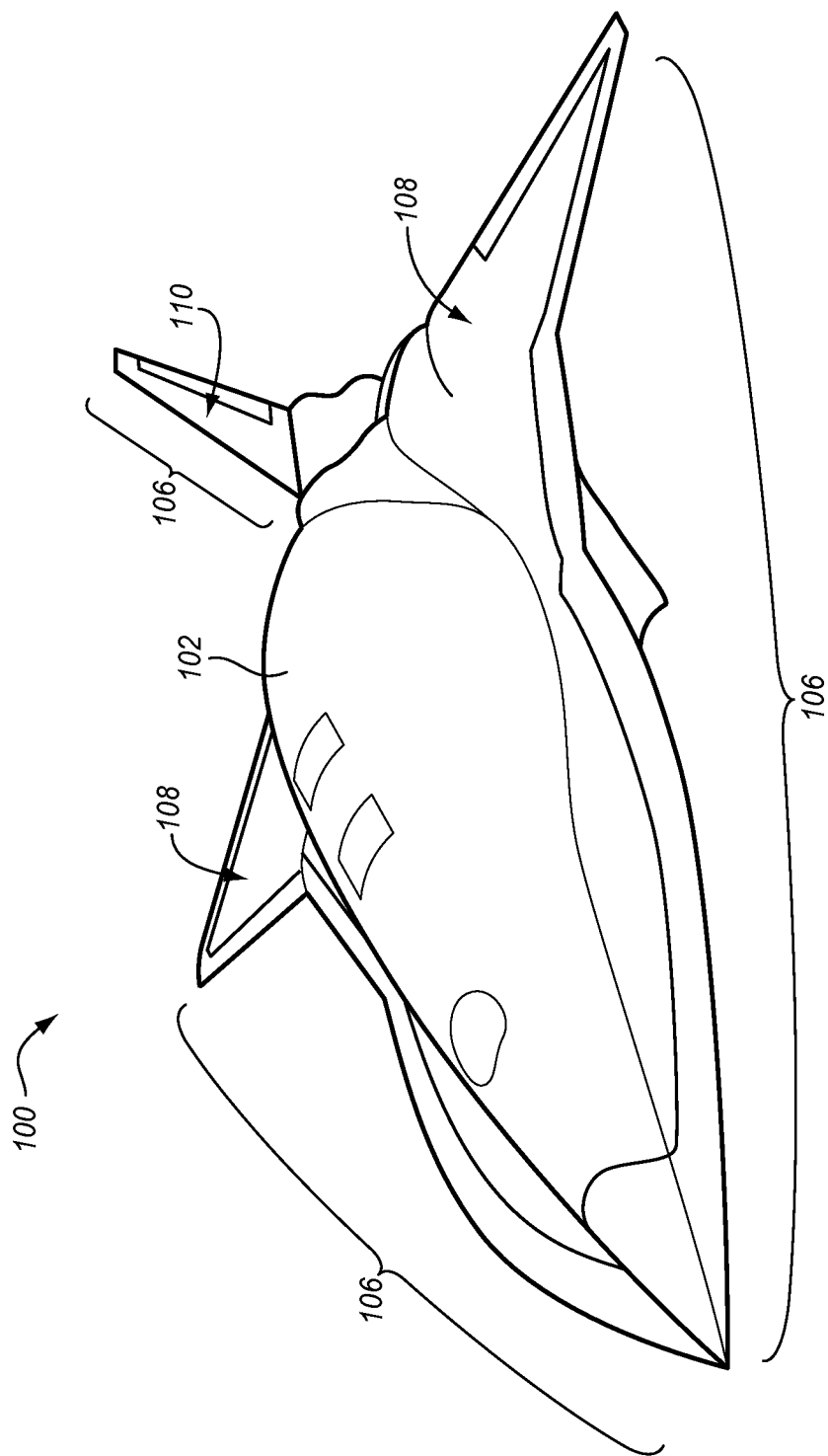
FIG. 1 illustrates an aircraft in an exemplary embodiment.

FIG. 1 illustrates an aircraft 100 in an exemplary embodiment. Aircraft 100 may be operated manned or unmanned as desired. Aircraft 100 is just one configuration of an aircraft capable of flight at hypersonic speed, and other configurations, not shown, may be implemented as desired. For example, aircraft 100 may have a different shape, size, aspect ratio, etc., as desired. Thus, aircraft 100 is merely shown in a particular configuration for purposes of discussion.

In this embodiment, aircraft 100 includes at least one high temperature component 106 (e.g., a leading surface, a jet engine component, a rocket component, a thermal battery component, etc.). For instance, some of the leading surfaces are located on a wing 108 of aircraft 100, and some of the leading surfaces are located on a tail 110 of aircraft 100. During operation of aircraft 100 in hypersonic flight (e.g., aircraft 100 moves at hypersonic speeds of Mach 5 and above), the leading surfaces are impinged by air molecules moving at high speed, which heats the leading surfaces. Accordingly, the heated leading surfaces at high speeds can be considered high temperature components 106. The temperature of the leading surfaces can exceed 1000 degrees Celsius, which can heat components within aircraft 100 that may be sensitive to high temperatures. For instance, at such high temperatures, heat may be rapidly transferred from the leading surfaces into the interior of aircraft 100, adversely impacting electronic systems within aircraft 100 (e.g., flight electronics, control systems, etc.).

Figure 2:
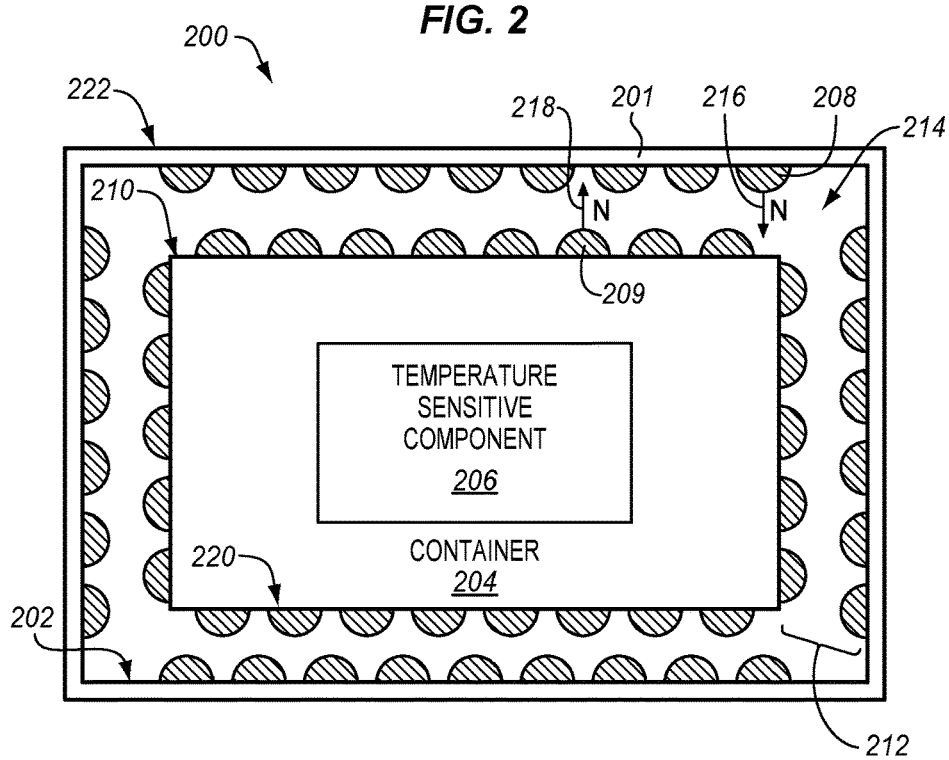
FIG. 2 illustrates a thermal insulation system in an exemplary embodiment.

FIG. 2 illustrates a thermal insulation system 200 for use with aircraft 100 in an exemplary embodiment. Thermal insulation system 200 may be used to provide thermal insulation between at least one high temperature component 106 and at least one temperature sensitive component 206 (e.g., electronics on aircraft 100). Thermal insulation system 200 includes a carrier 201 that surrounds a container 204. Carrier 201 and/or container 204 may be formed from a magnetically permeable material or may comprise steel with a magnetically permeable cladding in some embodiments. One example of a magnetically permeable material is a nickel-iron soft magnetic alloy, such as MuMETAL®. An exterior surface 222 of carrier 201 is thermally coupled to high temperature component 106. Carrier 201 has an interior space 214 that is defined by an interior surface 202 of carrier 201. Container 204 includes temperature sensitive component 206 (e.g., electronics) for aircraft 100 that is thermally coupled to an interior surface 220 of container 204. Some examples of temperature sensitive component 206 for aircraft 100 include power supplies, processors, memory devices, accelerometers, Radio Frequency (RF) transmitters, RF receivers, inertial sensors, etc.

In the exemplary embodiment, magnets 208 are embedded within, and/or are located on a surface of, interior surface 202. Magnets 208 generate a magnetic field 216 that is oriented in a direction indicated by an arrow toward container 204.

Further, in the exemplary embodiment, magnets 209 are embedded within, and/or are located on a surface of, an exterior surface 210 of container 204. Magnets 209 generate a magnetic field 218 that is oriented in a direction indicated by an arrow toward interior surface 202 of carrier 201.

The magnetic fields of magnets 208-209 are configured to be in opposition to each other. For instance, the magnetic field orientation of magnets 208 are configured to be opposite the magnetic field orientation of magnets 209. Due to the opposing magnetic fields, container 204 is separated away from interior surface 202 of carrier 201, and may be centered within interior space 214 of carrier 201. This separation forms a gap 212 between interior surface 202 of carrier and exterior surface 210 of container 204. Magnets 208-209 may include permanent magnets or electromagnets, or some combination of permanent magnets and electromagnets as desired. Some examples of materials that may be used to form magnets 208-209 include heusler alloys formed from Co, Fe, Cu, Zr, sintered alloys of Co, Fe, Cu, Zr, NdFeB, SmCo, Alnico, etc. At higher field strengths, magnets 208-209 may include rounded corners to avoid extreme B field enhancements.

The wall materials used for carrier 201 and/or container 204 may be formed from lower magnetic permeability materials such as steel. The walls may also be formed from higher magnetic permeability materials such as iron, nickel, cobalt, and alloys.

During flight, such as hypersonic flight, temperatures of high temperature component 106 of aircraft 100 (see FIG. 1) increase and may transfer heat into carrier 201. Gap 212 formed due to magnetic repulsion between magnets 208-209 prevents container 204 from directly contacting carrier 201. Accordingly, gap 212 reduces the heat transfer between carrier 201 and container 204, which in turn, reduces the heat transfer between carrier 201 and temperature sensitive component 206. In some embodiments, exterior surface 210 of container 204 may include an infrared (IR) reflective coating and/or low emissivity paint that is configured to reduce the heat transfer from carrier 201 to container 204 due to radiative heat transfer. In other embodiments, gap 212 may be under vacuum to reduce the heat transfer between carrier 201 and container 204 due to convective heat transfer. In some embodiments, a coolant may flow within gap 212 such that the coolant removes heat from container 204. The coolant may be a gas or a liquid as desired. For instance, the coolant may be a fuel for aircraft 100 that flows past container 204 through gap 212.

Figure 3:
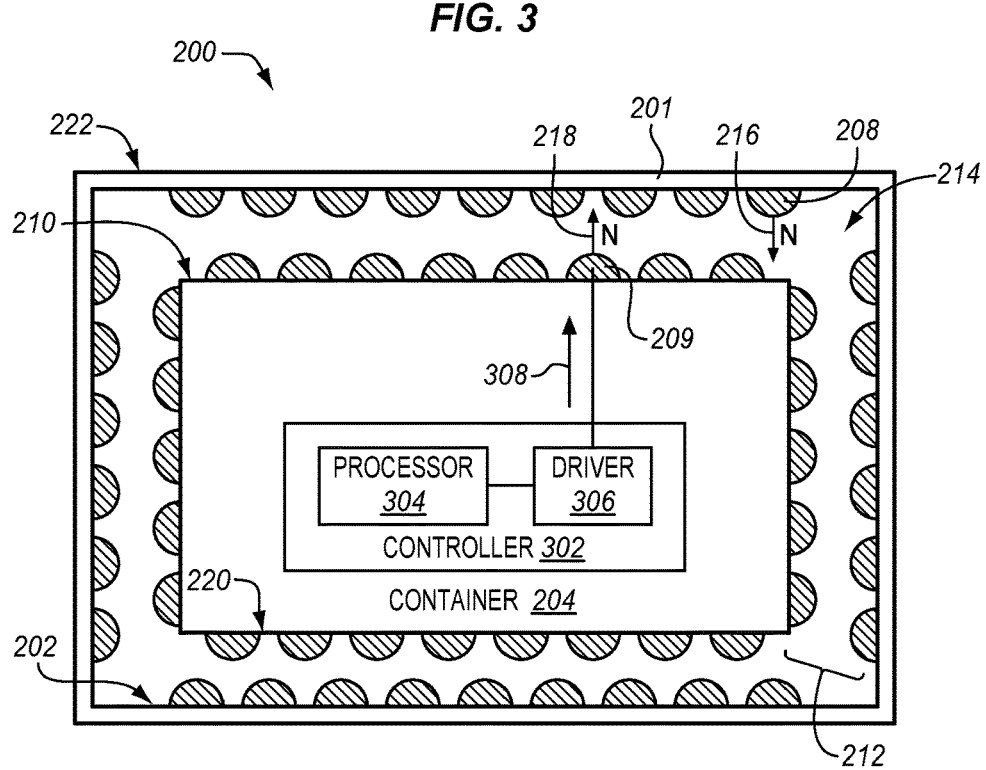
FIG. 3 illustrates another view of the thermal insulation system of FIG. 2 in an exemplary embodiment.

FIG. 3 illustrates another view of thermal insulation system 200 in an exemplary embodiment. In this embodiment, magnets 209 along exterior surface 210 of container 204 are electromagnets. A controller 302 within container 204 is capable of generating an excitation current 308 that is used to generate and/or vary the magnetic field strength of magnets 209. During flight, controller 302 may provide excitation current 308 to magnets 209 to generate gap 212 between interior surface 202 of carrier 201 and exterior surface 210 of container 204.

In some embodiments, controller 302 may monitor gap 212 and adjust excitation current 308 to adjust gap 212. During flight of aircraft 100, turbulence may cause gap 212 to vary in magnitude as a motion is introduced between carrier 201 and container 204. Over time, these motions or variations of gap 212 may cause heating of container 204 due to the time varying magnetic fields induced upon container 204. Controller 302 is able to monitor the changes in gap 212, and to vary excitation current 308 to dampen or reduce the variations in gap 212, which in turn reduces the heating that may be imposed upon container 204 due to magnetic eddy currents.

While the specific hardware implementation of controller 302 is subject to design choices, one particular embodiment includes one or more processors 304 coupled with a current driver 306. Processor 304 includes any electronic circuits and/or optical circuits that are able to perform the functions described herein. For example, processor 304 may perform any functionality described herein for controller 302. Processor 304 may include one or more Central Processing Units (CPU), microprocessors, Digital Signal Processors (DSPs), Application-specific Integrated Circuits (ASICs), Programmable Logic Devices (PLD), control circuitry, etc. Some examples of processors include INTEL® CORE™ processors, Advanced Reduced Instruction Set Computing (RISC) Machines (ARM®) processors, etc.

Current driver 306 includes any electronic circuits, and/or optical circuits, and/or power electronic circuits that are able to generate and/or vary excitation current 308. For instance, current driver 306 may include solid state power relays, switched-contact power relays, transistors, Metal Oxide Field Effect Transistors (MOSFETS), Field Effect Transistors (FETS), etc., used to generate and/or vary excitation current 308.

Figure 4:
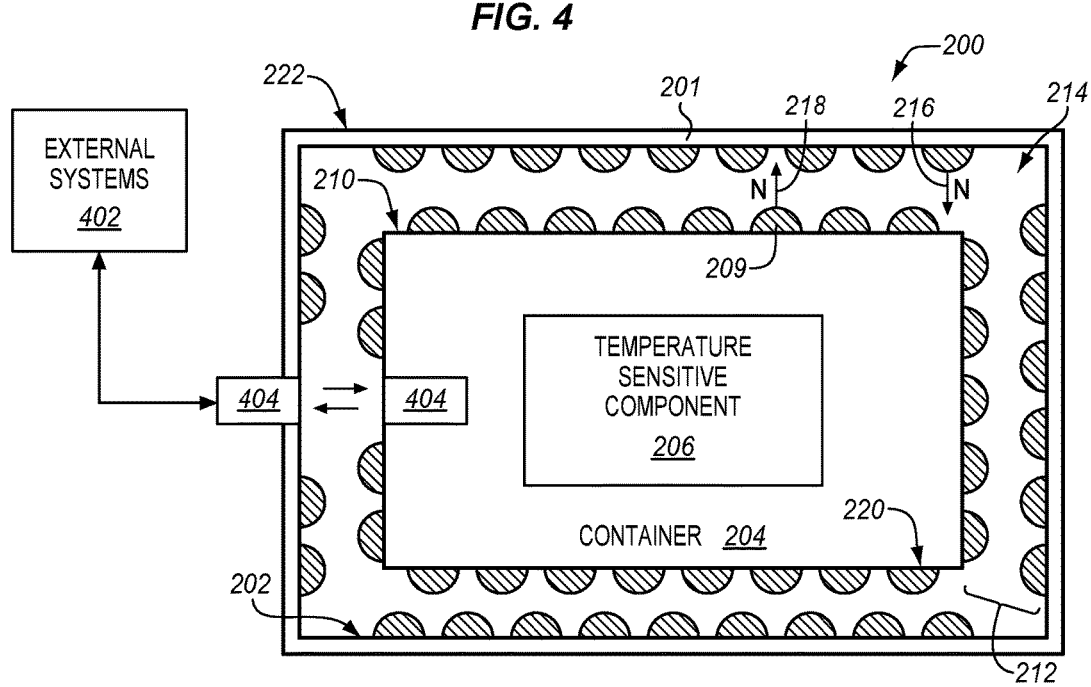
FIG. 4 illustrates another view of the thermal insulation system of FIG. 2 in an exemplary embodiment.

FIG. 4 illustrates another view of thermal insulation system 200 in an exemplary embodiment. As shown in FIG. 4, temperature sensitive component 206 is capable of communicating with external systems 402 (e.g., electronic systems outside of container 204) utilizing one or more transceivers 404. Transceivers 404 may include RF transmitter/receiver pairs, optical transmitter/receiver pairs, fiber optic bundles, small gauge copper wires, quartz fibers, etc., which allow for non-contact or thermally non-conductive communications between temperature sensitive component 206 and external systems 402. Non-contact or thermally non-conductive communications are desired for reducing the heat transfer from carrier 201 to container 204 and ultimately, for reducing the heat transfer from carrier 201 to temperature sensitive component 206.

Figure 5:
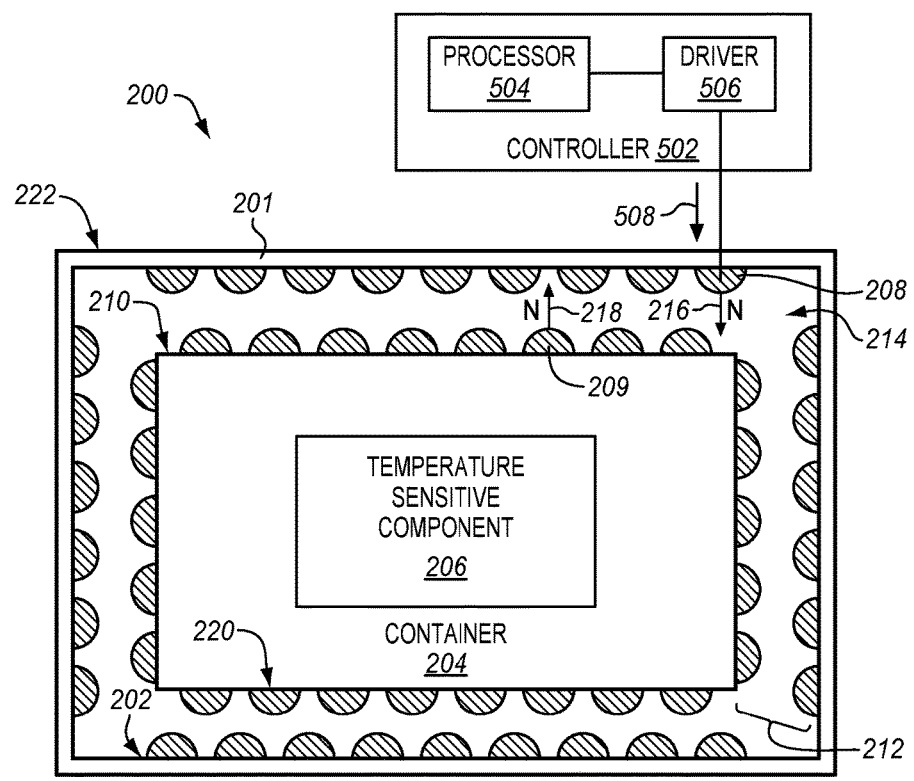
FIG. 5 illustrates another view of the thermal insulation system of FIG. 2 in an exemplary embodiment.

FIG. 5 illustrates another view of thermal insulation system 200 in an exemplary embodiment. As shown in FIG. 5, magnets 208 along interior surface 202 of carrier 201 are electromagnets. A controller 502 is capable of generating an excitation current 508 that is used to generate and/or vary the magnetic field strength of magnets 208. During flight, controller 502 may provide excitation current 508 to magnets 208 to generate gap 212 between interior surface 202 of carrier 201 and exterior surface 210 of container 204.

In some embodiments, controller 502 may monitor gap 212 and adjust excitation current 508 to adjust gap 212 in a manner previously described for controller 302. In embodiments where both controller 302 and controller 502 are included in thermal insulation system 200, coordination may occur between controller 302 and controller 502 to initiate gap 212 and/or vary gap 212 during flight. This coordination may be possible using transceivers 404 illustrated and previously discussed with respect to FIG. 4. In embodiments where only controller 302 is present, then magnets 208 may comprise permanent magnets, while magnets 209 comprise electromagnets. In embodiments where only controller 502 is present, then magnets 209 may comprise permanent magnets, while magnets 208 comprise electromagnets.

While the specific hardware implementation of controller 502 is subject to design choices, one particular embodiment includes one or more processors 504 coupled with a current driver 506. Processor 504 may include hardware embodiments previously described for processor 304, and current driver 506 may include hardware embodiments previously described for current driver 306.

Figure 6:
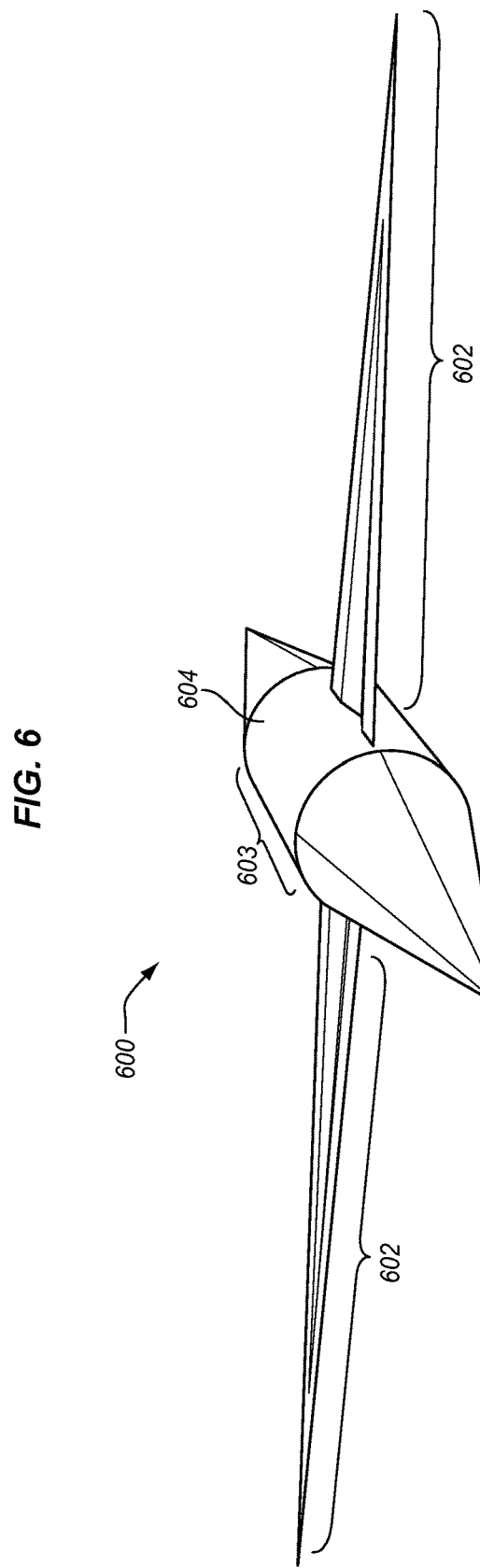
FIG. 6 illustrates another aircraft in an exemplary embodiment.

FIG. 6 illustrates another aircraft 600 in an exemplary embodiment. In some embodiments, aircraft 600 may be configured for hypersonic flight (e.g., aircraft 600 may be configured to fly at hypersonic speeds of Mach 5 and above). Aircraft 600 is just one configuration of an aircraft, and other configurations, not shown, may be implemented as desired. For example, aircraft 600 may have a different shape, size, aspect ratio, etc., as desired. Thus, aircraft 600 is merely shown in a particular configuration for purposes of discussion. In this embodiment, aircraft 600 includes high temperature component 602 (e.g., leading surfaces), which are located along an outer surface 603 of a collar 604.

Figure 7:
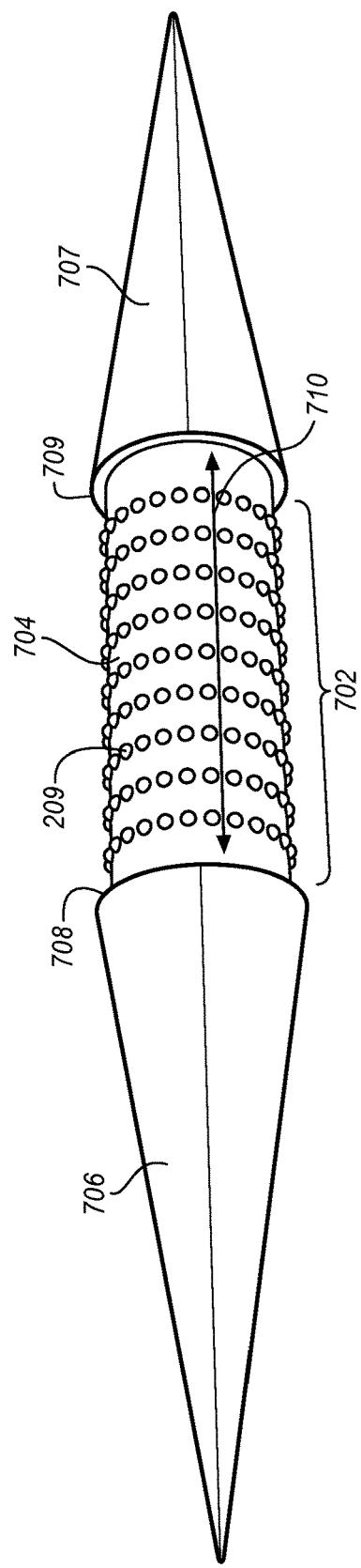
FIG. 7 illustrates a cylindrical section of the aircraft of FIG. 6 in an exemplary embodiment.

FIG. 7 illustrates a portion of aircraft 600 including a cylindrical section 702. In this view, magnets 209 are located on an outer surface 704 of cylindrical section 702. FIG. 7 also illustrates cones 706-707, which are coupled to cylindrical section 702. Cone 706 is coupled to end 708 of cylindrical section 702, and cone 707 is coupled to end 709 of cylindrical section 702. Where cones 706-707 and ends 708-709 meet, features are formed to prevent collar 604 from translating axially between ends 708-709 of cylindrical section 702 along a long axis 710 of cylindrical section 702. In this embodiment, collar 604 is free to rotate with respect to cylindrical section 702.

In this embodiment, collar 604 circumscribes cylindrical section 702 of aircraft 600. In some embodiments, outer surface 704 of cylindrical section 702 may include an IR reflective coating configured to reduce the heat transfer from collar 604 to cylindrical section 702 due to radiative heat transfer.

Figure 8:
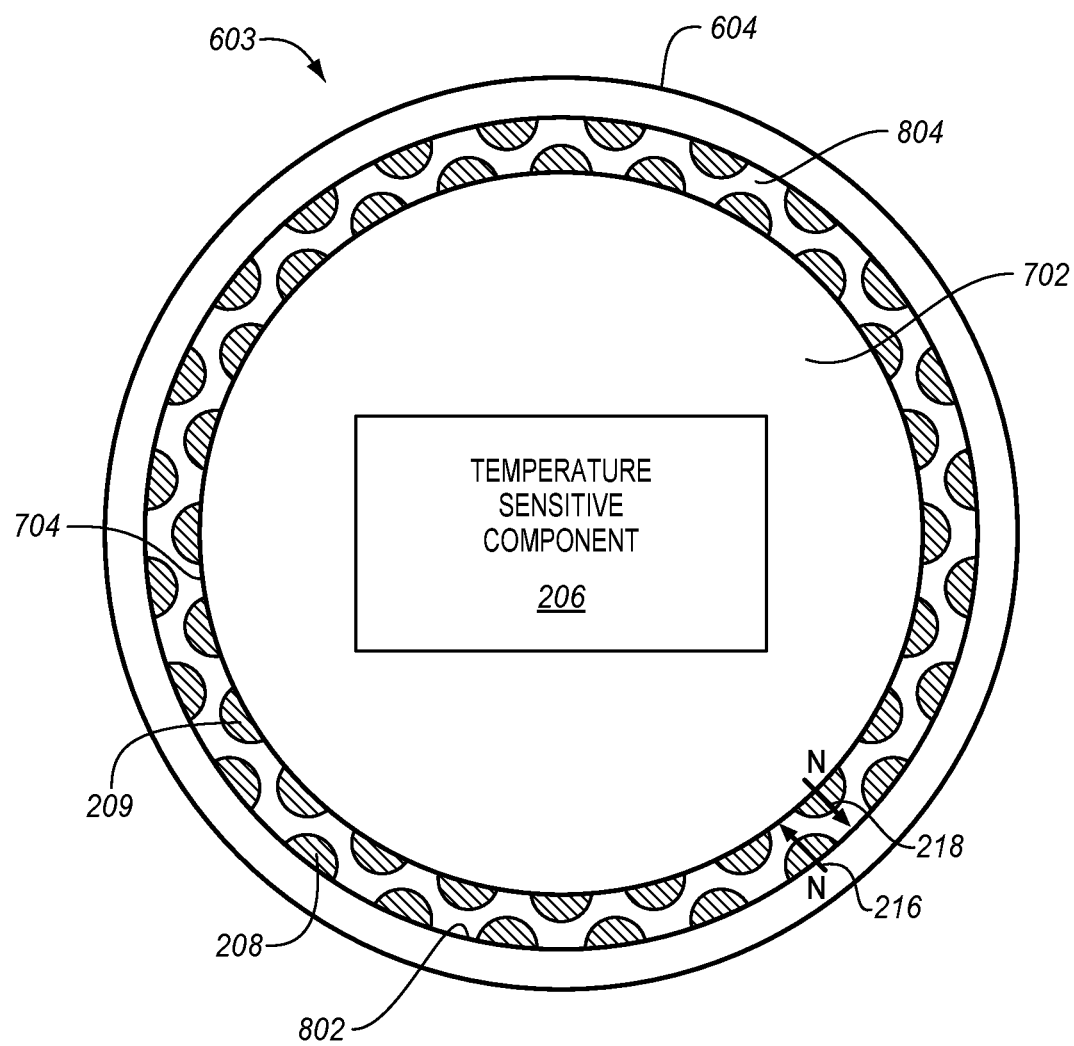
FIG. 8 illustrates a portion of a collar and a portion of the cylindrical section of FIG. 7 in an exemplary embodiment.

FIG. 8 illustrates a portion of collar 604 and a portion of a cylindrical section 702 of aircraft 600. In this view, collar 604 circumscribes cylindrical section 702. In particular, an inner surface 802 of collar 604 faces outer surface 704 of cylindrical section 702. Collar 604 includes a plurality and/or an array of magnets 208. Cylindrical section 702 also includes a plurality and/or an array of magnets 209. Magnets 208-209 have opposing magnetic fields that generate a gap 804 between collar 604 and cylindrical section 702.

During flight, temperatures of high temperature components 602 (e.g., leading surfaces) of aircraft 600 (see FIG. 6) increase and high temperature components may transfer heat to collar 604. If collar 604 were in thermal contact with cylindrical section 702, then heat transfer would occur from high temperature components 602 into cylindrical section 702 via collar 604. However, gap 804 formed due to the magnetic repulsion between magnets 208-209 prevents collar 604 from contacting cylindrical section 702 of aircraft 600. Accordingly, gap 804 reduces the heat transfer between collar 604 and cylindrical section 702, which in turn, reduces the heat transfer between collar 604 and temperature sensitive component 206 that are contained within cylindrical section 702. In some embodiments, controller 302 and/or controller 502 may monitor gap 804 as previously described above for FIG. 3 and FIG. 5. For instance, with controller 302 modifying excitation current 308 applied to magnets 209, and/or with controller 502 modifying excitation current 508 applied to magnets 208. Therefore, any of the previously described functionality for controller 302 and/or controller 502 may apply for controlling gap 804 in aircraft 600.

Using the magnetic spacing generated between the high temperature components and the temperature sensitive components onboard an aircraft, aerodynamic heating can be reduced or eliminated, especially during hypersonic flight of the aircraft.

Figure 9:
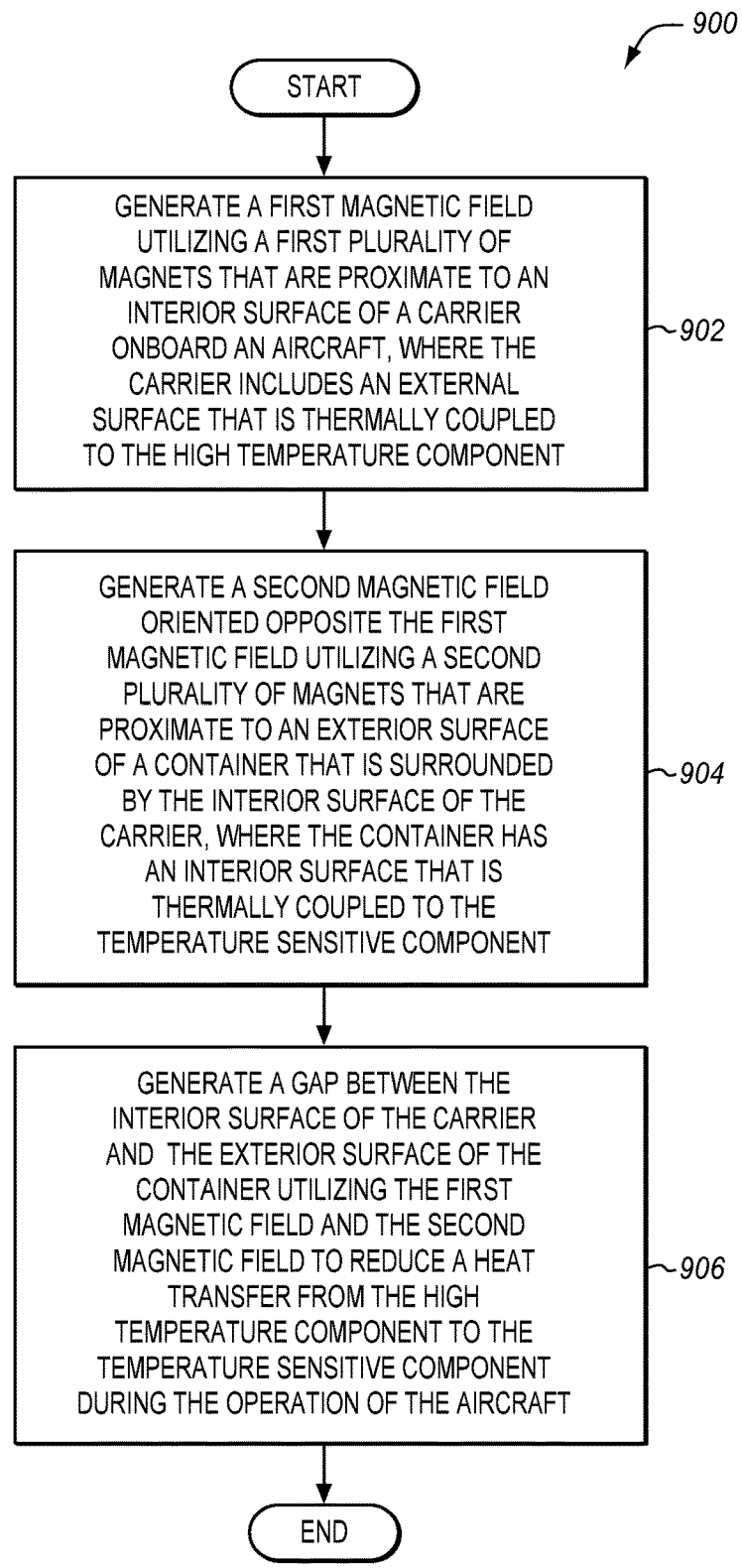
FIG. 9 is a flow chart of a method of thermally isolating a high temperature component of an aircraft from a temperature sensitive component of the aircraft during operation of the aircraft in an exemplary embodiment.

FIG. 9 is a flow chart of a method 900 of thermally isolating a high temperature component of an aircraft from a temperature sensitive component of the aircraft during operation of the aircraft in an exemplary embodiment. Method 900 will be described with respect to thermal insulation system 200, although method 900 may be performed by other systems, not shown. The steps of the methods described herein may include other steps, not shown. Also, the steps may be performed an alternate order.

Referring to FIG. 2, magnets 208 that are proximate to interior surface 202 of carrier 201 generate a magnetic field 216 (see step 902). Magnets 209 on container 204 also generate a magnetic field 218. Magnetic field 218 is oriented opposite of magnetic field 216 (see step 904). Magnets 208-209 may comprise permanent magnets, electromagnets, or combinations of permanent magnets and electromagnets. Since magnetic field 216 and magnetic field 218 oppose each other, a repulsive force is generated between carrier 201 and container 204, forming gap 212 (see step 906). Gap 212 separates container 204 from carrier 201 and provides a thermal barrier between container 204 and carrier 201. As high temperature component 106 is thermally coupled to exterior surface 222 of carrier 201, and temperature sensitive component 206 is thermally coupled in interior surface 220 of container 204, the heat transfer from high temperature component 106 to temperature sensitive component 206 is reduced utilizing gap 212.

Figure 10:
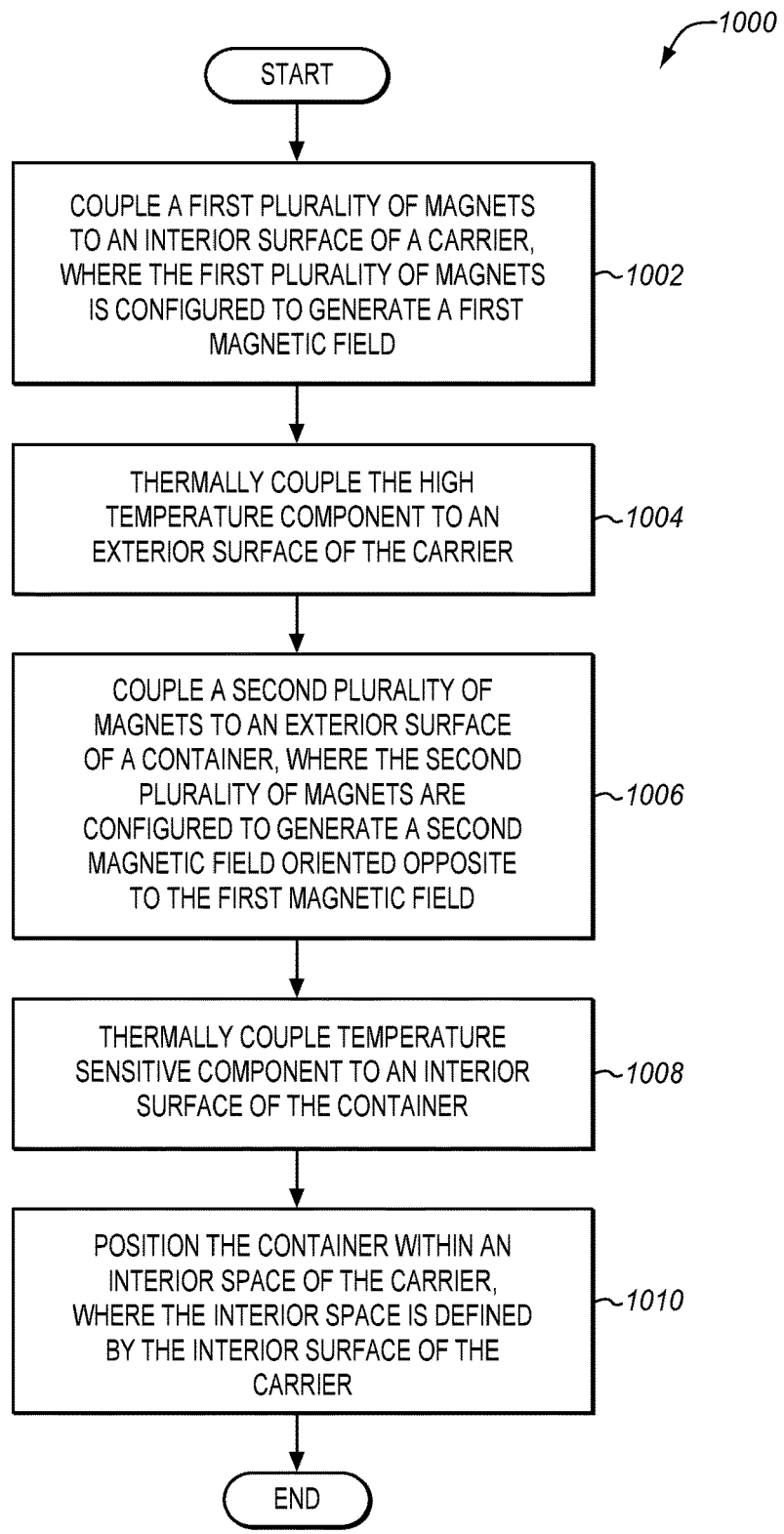
FIG. 10 is a flow chart of a method of assembly of a thermal insulation system for an aircraft that includes a high temperature component and a temperature sensitive component in an exemplary embodiment.

FIG. 10 is a flow chart of a method 1000 of assembly of a thermal insulation system for an aircraft that includes a high temperature component and a temperature sensitive component in an exemplary embodiment. Method 1000 will be described with respect to thermal insulation system 200, although method 1000 may apply to other thermal insulation systems, not shown.

Figure 11:
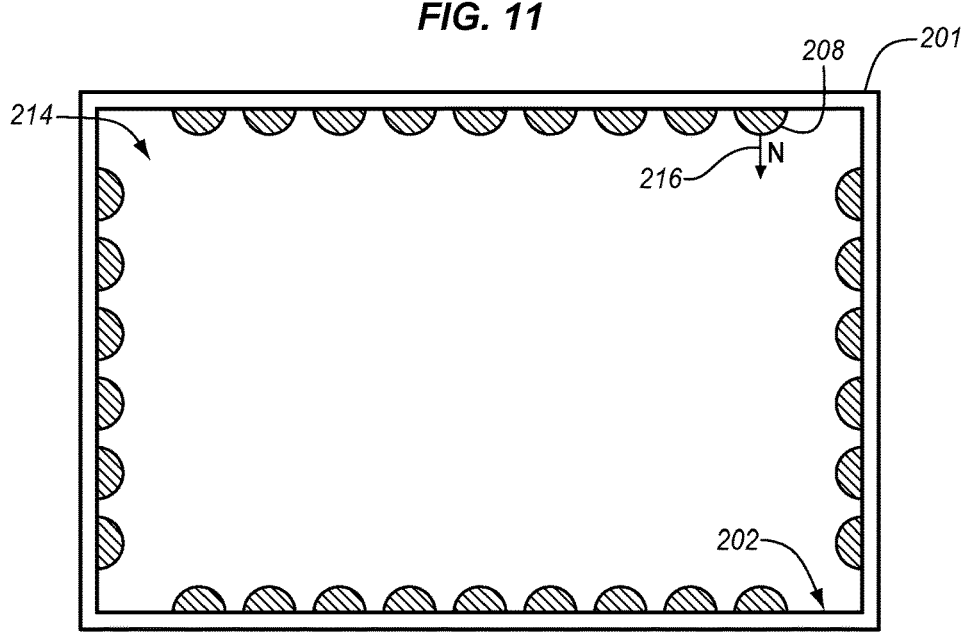
FIG. 11 illustrates a carrier with magnets coupled to an interior surface in an exemplary embodiment.

During the assembly process of thermal insulation system 200, magnets 208 are coupled to interior surface 202 of carrier 201 (see step 1002). Magnets 208 are coupled in such a way that they exhibit the same magnetic field orientation (e.g., magnetic field 216, which has a north pole that points into interior space 214 of carrier 201). Magnets 208 may be bonded to interior surface 202 (e.g., using an adhesive), affixed using a fastener, and/or be formed partially or completely within interior surface 202 of carrier 201. FIG. 11 illustrates carrier 201 with magnets 208 coupled to interior surface 202 in an exemplary embodiment.

Figure 12:
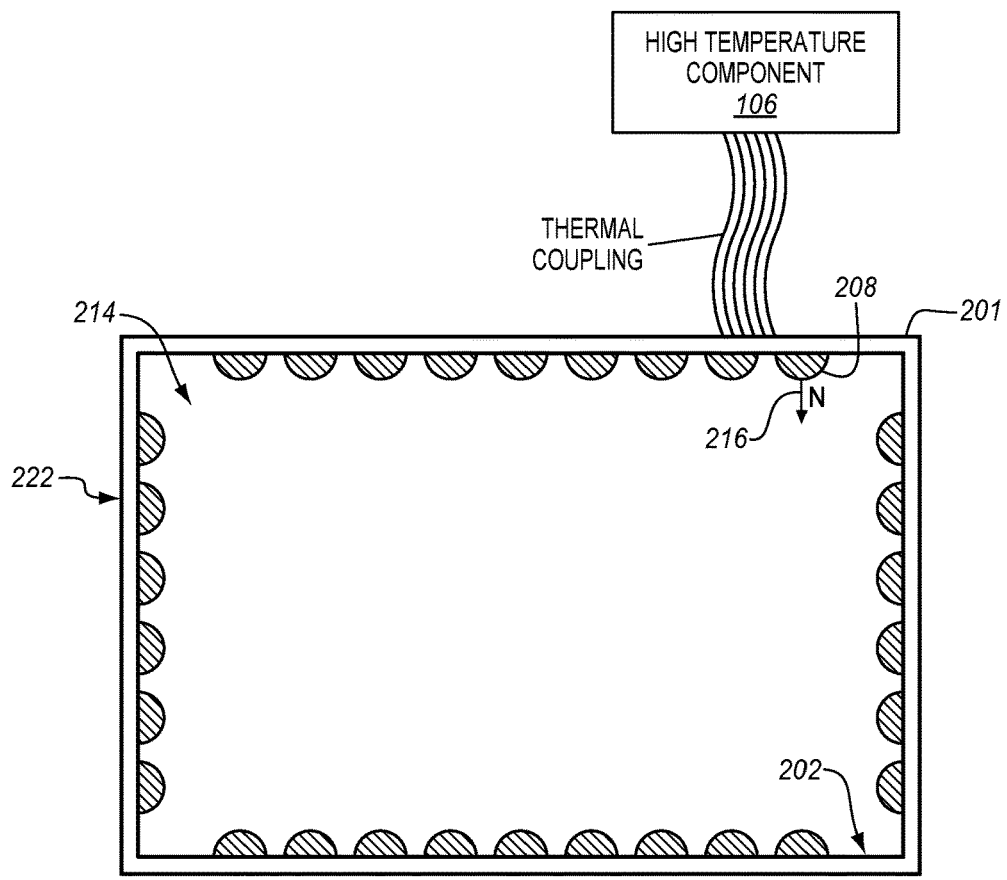
FIG. 12 illustrates an exterior surface of a carrier that is thermally coupled to a high temperature component in an exemplary embodiment.

Exterior surface 222 of carrier 201 is thermally coupled to high temperature component 106 (see step 1004). For example, exterior surface 222 may be thermally coupled to leading edges of airframe 102, to engine housings, or other high temperature features on aircraft 100 using any number of thermally conductive materials as desired. FIG. 12 illustrates exterior surface 222 of carrier 201 thermally coupled to high temperature component 106 in an exemplary embodiment.

Figure 13:
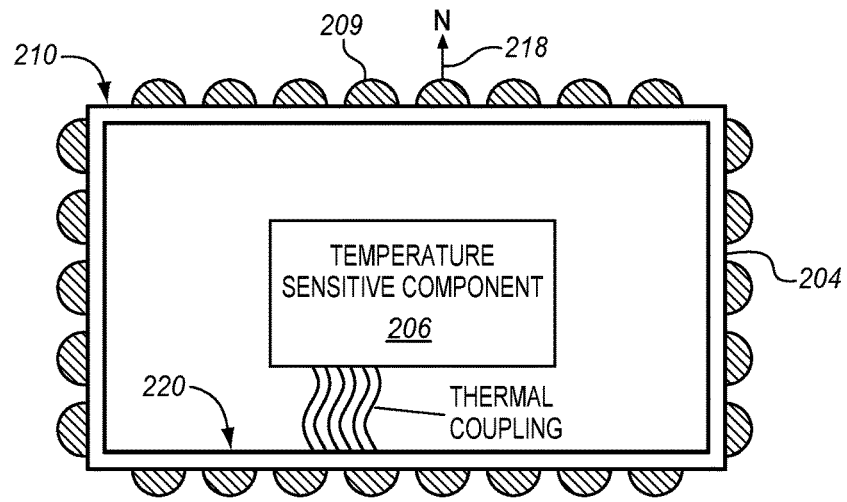
FIG. 13 illustrates a container with magnets coupled to an exterior surface of the container in an exemplary embodiment.

Magnets 209 are coupled to exterior surface 210 of container 204 (see step 1006). Magnets 209 are coupled in such a way that they exhibit the same magnetic field orientation (e.g., magnetic field 218). Magnets 209 may be bonded to exterior surface 210 (e.g., using an adhesive), affixed using a fastener, and/or be formed partially or completely within exterior surface 210 of container 204. FIG. 13 illustrates container 204 with magnets 209 coupled to exterior surface 210 of container 204 in an exemplary embodiment.

Interior surface 220 of container 204 is thermally coupled to temperature sensitive component 206 (see step 1008). For example, interior surface 220 of container 204 may be thermally coupled to electronics, sensors, power supplies, or other temperature sensitive features on aircraft 100 using any number of thermally conductive materials as desired. FIG. 13 illustrates interior surface 220 of container 204 thermally coupled to temperature sensitive component 206 in an exemplary embodiment.

Figure 14:
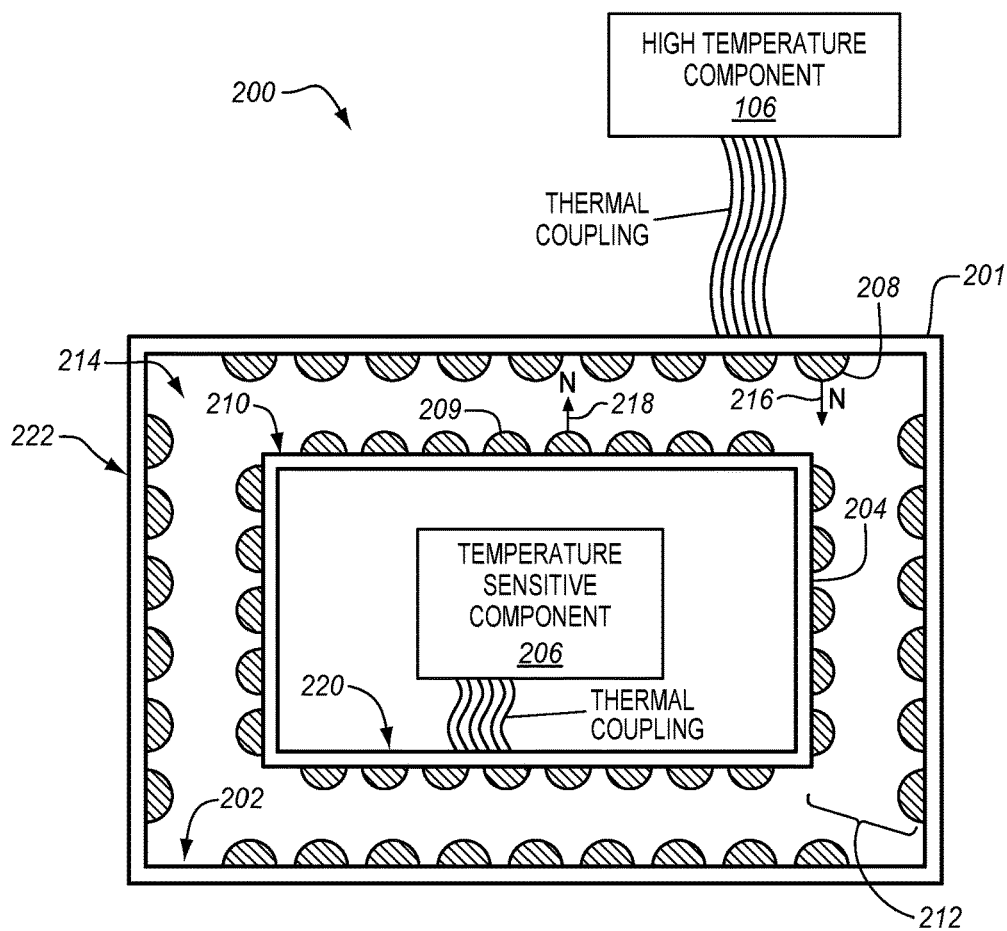
FIG. 14 illustrates a container positioned within an interior space of a carrier in an exemplary embodiment.

Container 204 is positioned within interior space 214 of carrier 201, where interior space 214 is defined by interior surface 202 of carrier 201 (see step 1010). FIG. 14 illustrates container 204 positioned within interior space 214 of carrier 201 in an exemplary embodiment.

Figure 15:
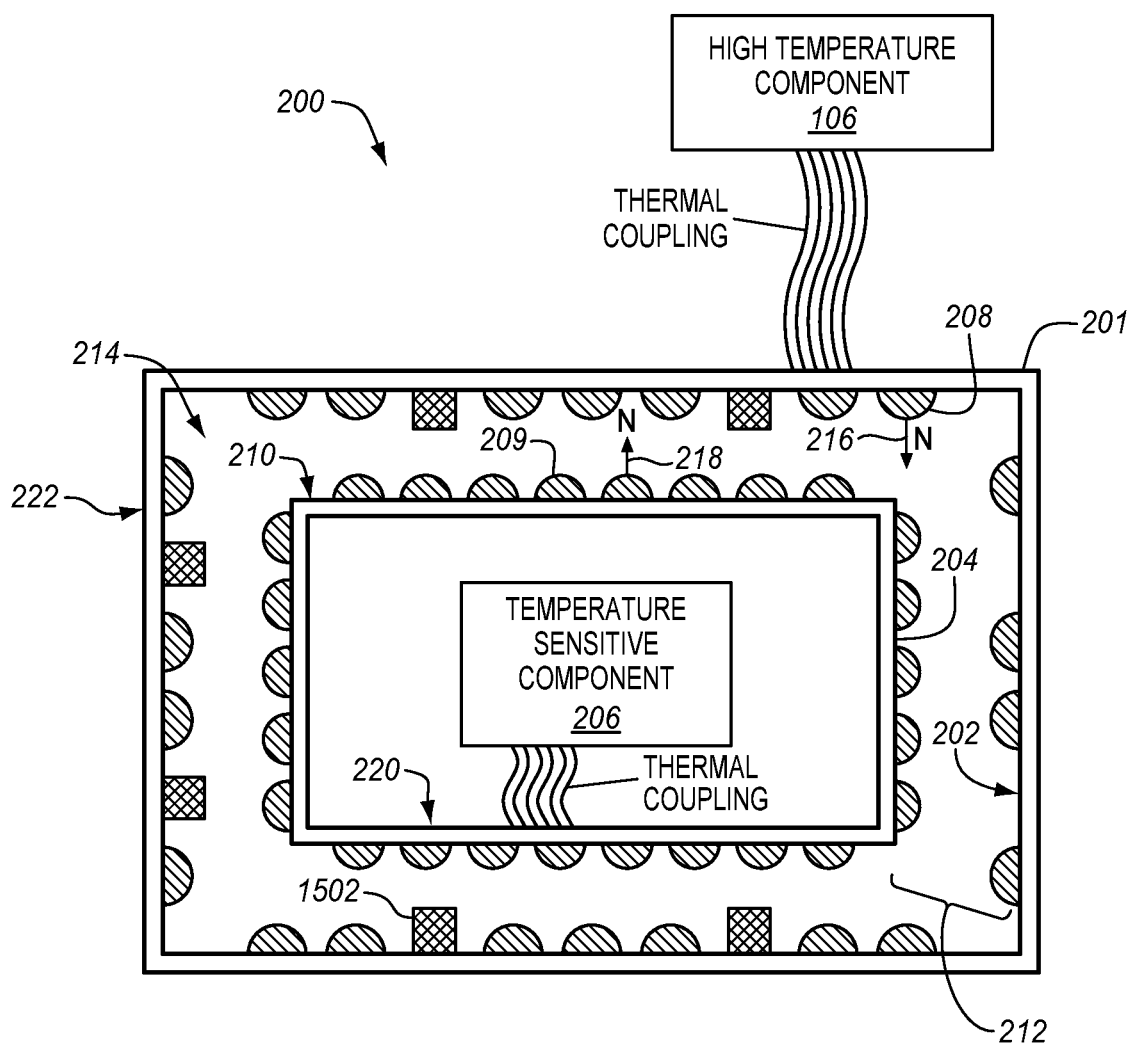
FIG. 15. illustrates a thermal insulation system that includes shock-absorbing stops in an exemplary embodiment.

FIG. 15 illustrates thermal insulation system 200 including shock-absorbing stops 1502 in an exemplary embodiment. Although shock-absorbing stops 1502 have been illustrated as being located on interior surface 202 of carrier 201, shock-absorbing stops 1502 may alternatively or additionally be located on exterior surface 210 of container 204. In this embodiment, shock-absorbing stops 1502 are used to prevent carrier 201 from contacting container 204 in cases where the repulsive force generated by magnets 208-209 is temporarily overcome (e.g., due to high acceleration events). Shock-absorbing stops 1502 may be used to prevent damage that may occur to thermal insulation system 200 under these extreme circumstances. Shock-absorbing stops 1502 may be formed from high temperature shock-absorbing materials. Some examples of high temperature shock-absorbing materials include silicone, fluorosilicone, fluorocarbon, high density polyethylene, perfluoroelastomeric compounds, etc. In some embodiments, interior surface 202 of carrier 201 and/or exterior surface 210 of container 204 may be configured to convert the relative movement of carrier 201 and container 204 into an electric current (e.g., using loops of conductive wires embedded within carrier 201 and/or container 204). The electric current harvested from the relative movement may be utilized to power small sensors or electronic components (e.g., small power loads of temperature sensitive component 206). In addition to the generation of current, the loops may provide vibration dampening.

Carrier 201 and/or container 204 may include thermoelectric coolers in some embodiments. For example, exterior surface 210 of container 204 may include the hot side of a thermoelectric cooler, with the cold side located along interior surface 220 of container 204. An electric current (e.g., the harvested electric current) may be used by the thermoelectric cooler to cool the interior of container 204, while radiating the heat into interior space 214 of carrier 201.

Figure 16:
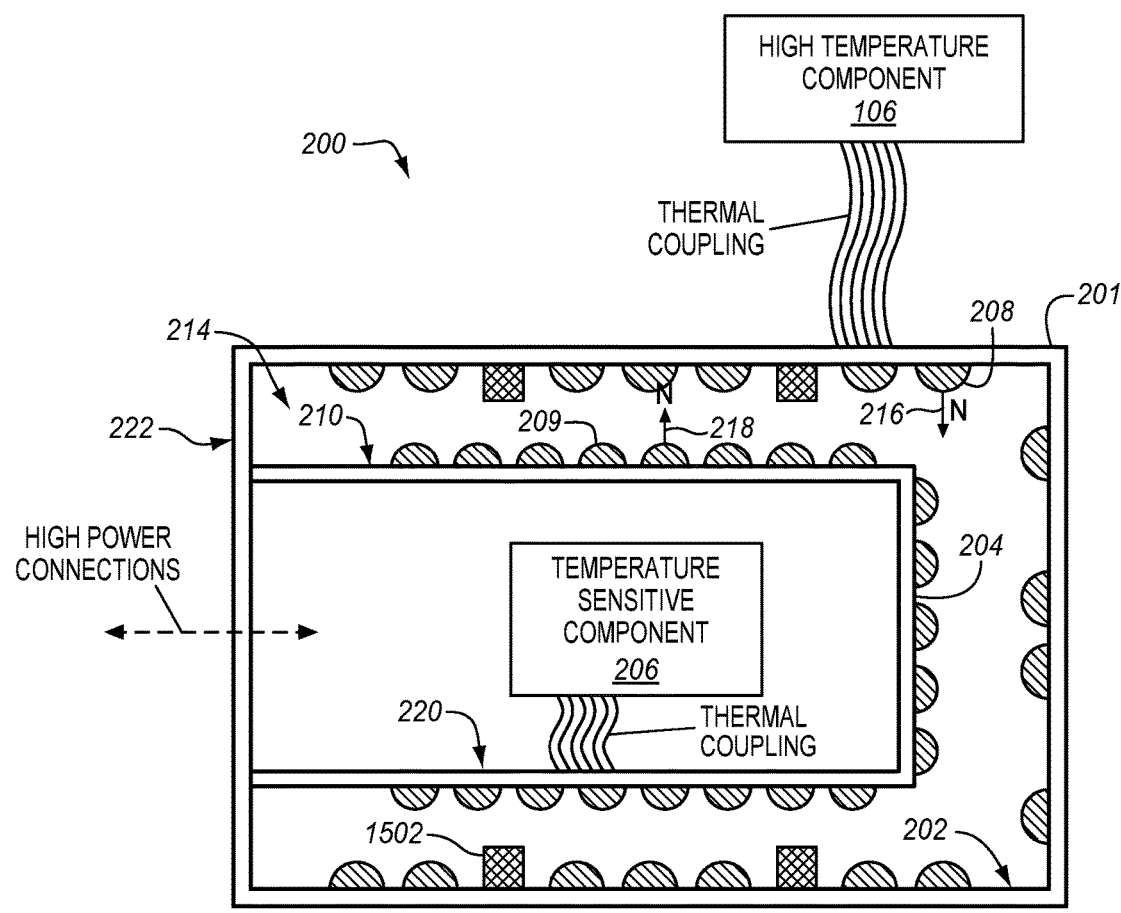
FIG. 16 illustrates a thermal insulation system utilizing a cantilevered container in an exemplary embodiment.

FIG. 16 illustrates thermal insulation system 200 utilizing a cantilevered container 204 in an exemplary embodiment. In some cases, it may be desirable to cool container 204 by allowing container 204 to directly contact a fuel, while ensuring that high power connections can traverse from carrier 201 into container 204. For instance, carrier 201 may comprise a fuel tank for aircraft 100, while temperature sensitive component 206 may comprises a high-power microwave amplifier for a RAdio Detection and Ranging (RADAR) system. Cantilevering container 204 into a fuel tank allows container 204 to be surrounded by fuel, which cools container 204. Yet, the motion of container 204 can be controlled using magnetic field 216 and magnetic field 218, as previously described. In some embodiments, container 206 may comprise a heat exchanger. When a heat exchanger is placed within a fuel tank to utilize the fuel as a coolant, the typical placement of the heat exchanger is at the bottom of the fuel tank. When container 204 comprises a heat exchanger, additional options are available for the placement of the heat exchanger within the fuel tank (e.g., on the sides or top of the fuel tank).

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

What is claimed is:

1. A thermal insulation system for an aircraft that includes at least one high temperature component and at least one temperature sensitive component, the thermal insulation system comprising:
   a carrier comprising an interior surface that comprises:
      a first plurality of magnets, comprising electromagnets that are configured to generate a first magnetic field, and
      an exterior surface, thermally coupled to the at least one high temperature component;
   a container, surrounded by the interior surface of the carrier, the container comprising:
      an exterior surface, comprising a second plurality of magnets, configured to generate a second magnetic field oriented opposite the first magnetic field, and
      an interior surface, thermally coupled to the at least one temperature sensitive component; and
   at least one controller,
   wherein the first magnetic field and the second magnetic field are configured to generate a gap between the interior surface of the carrier and the exterior surface of the container to reduce heat transfer from the at least one high temperature component to the at least one temperature sensitive component during operation of the aircraft,
   wherein the at least one controller is configured to apply an excitation current to the first plurality of magnets to generate the first magnetic field, to monitor variations in the gap between the exterior surface of the container and the interior surface of the carrier, and to vary the excitation current applied to the first plurality of magnets to reduce the variations in the gap.

2. The thermal insulation system of claim 1, wherein:
   the second plurality of magnets comprise electromagnets, and
   the at least one controller is configured to apply an excitation current to the second plurality of magnets to generate the second magnetic field.

3. The thermal insulation system of claim 2, wherein:
   the at least one controller is configured to vary the excitation current applied to the second plurality of magnets to reduce the variations in the gap.

4. The thermal insulation system of claim 1, further comprising an Infrared reflective coating, applied to the exterior surface of the container.

5. The thermal insulation system of claim 1, further comprising an Infrared reflective coating, applied to the interior surface of the carrier.

6. The thermal insulation system of claim 1, further comprising:
   a vacuum line, coupled to an interior space of the carrier, wherein the interior space of the carrier is defined by the interior surface of the carrier; and
   a vacuum source, coupled to the vacuum line.

7. The thermal insulation system of claim 1, further comprising:
   a coolant line, coupled to an interior space of the carrier, wherein the interior space of the carrier is defined by the interior surface of the carrier; and
   a coolant source, coupled to the coolant line.

8. The thermal insulation system of claim 7, wherein the coolant source comprises a fuel source for the aircraft.

9. The thermal insulation system of claim 1, wherein the at least one temperature sensitive component comprises flight electronics for the aircraft.

10. A method of thermally isolating a high temperature component of an aircraft from a temperature sensitive component of the aircraft during operation of the aircraft, the method comprising steps of:
- generating a first magnetic field utilizing a first plurality of magnets that are proximate to an interior surface of a carrier onboard the aircraft, wherein the carrier includes an external surface that is thermally coupled to the high temperature component;
- generating a second magnetic field oriented opposite the first magnetic field utilizing an excitation current, applied to a second plurality of magnets comprising electromagnets, wherein the second plurality of magnets are proximate to an exterior surface of a container, wherein the exterior surface of the container is surrounded by the interior surface of the carrier, wherein the container includes an interior surface that is thermally coupled to the temperature sensitive component;
- generating a gap between the interior surface of the carrier and the exterior surface of the container utilizing the first magnetic field and the second magnetic field to reduce a heat transfer from the high temperature component to the temperature sensitive component during the operation of the aircraft;
- monitoring variations in the gap between the exterior surface of the container and the interior surface of the carrier; and
- varying the excitation current applied to the second plurality of magnets to reduce the variations in the gap.

11. The method of claim 10, wherein:
- the first plurality of magnets comprises electromagnets; and
- the step of generating the first magnetic field further comprises applying an excitation current to the first plurality of magnets.

12. The method of claim 11, further comprising varying the excitation current, applied to the first plurality of magnets to reduce the variations in the gap.

13. A method of assembly of a thermal insulation system for an aircraft that includes a high temperature component and a temperature sensitive component, the method comprising:
- coupling a first plurality of magnets to an interior surface of a carrier, the first plurality of magnets configured to generate a first magnetic field;
- thermally coupling the high temperature component to an exterior surface of the carrier;
- coupling a second plurality of magnets to an exterior surface of a container, the second plurality of magnets configured to generate a second magnetic field oriented opposite to the first magnetic field;
- thermally coupling the temperature sensitive component to an interior surface of the container;
- positioning the container within an interior space of the carrier, the interior space defined by the interior surface of the carrier;
- coupling a coolant line to the interior space of the carrier; and
- coupling a fuel source for the aircraft to the coolant line.

14. The method of claim 13, wherein the step of coupling the first plurality of magnets to the interior surface of the carrier comprises:
- coupling a first plurality of electromagnets to the interior surface of the carrier; and
- electrically coupling the first plurality of electromagnets to a current source that is configured to apply an excitation current to generate the first magnetic field.

15. The method of claim 13, wherein the step of coupling the second plurality of magnets to the exterior surface of the container comprises:
- coupling a second plurality of electromagnets to the exterior surface of the container; and
- electrically coupling the second plurality of electromagnets to a current source that is configured to apply an excitation current to generate the second magnetic field.

16. The method of claim 13, further comprising:
- applying an Infrared reflective coating to the exterior surface of the container.

17. The method of claim 13, further comprising:
- applying an Infrared reflective coating to the interior surface of the carrier.

18. The method of claim 13, wherein the step of thermally coupling the high temperature component to the exterior surface of the carrier further comprises thermally coupling a leading surface of the aircraft to the exterior surface of the carrier.

19. The method of claim 13, wherein the step of thermally coupling the temperature sensitive component to the interior surface of the container further comprises thermally coupling flight electronics for the aircraft to the interior surface of the container.

20. The method of claim 13, further comprising:
- coupling a vacuum line to the interior space of the carrier; and
- coupling a vacuum source to the vacuum line.

* * * * *